(12) United States Patent
Chen et al.

(10) Patent No.: US 11,983,807 B2
(45) Date of Patent: May 14, 2024

(54) AUTOMATICALLY GENERATING MOTIONS OF AN AVATAR

(71) Applicant: Microsoft Technology Licensing, LLC, Redmond, WA (US)

(72) Inventors: Yueyang Chen, Redmond, WA (US); Xiang Xu, Redmond, WA (US); Ruihua Song, Beijing (CN); Shuo Wang, Redmond, WA (US); Hui Zhang, Redmond, WA (US); Di Li, Beijing (CN); Chengcheng Liu, Redmond, WA (US); Xiaoyu Qi, Redmond, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 550 days.

(21) Appl. No.: 17/253,034

(22) PCT Filed: Jul. 10, 2018

(86) PCT No.: PCT/CN2018/095198
§ 371 (c)(1),
(2) Date: Dec. 16, 2020

(87) PCT Pub. No.: WO2020/010530
PCT Pub. Date: Jan. 16, 2020

(65) Prior Publication Data
US 2021/0192824 A1 Jun. 24, 2021

(51) Int. Cl.
*G06T 13/40* (2011.01)
*G06F 16/43* (2019.01)
(Continued)

(52) U.S. Cl.
CPC .............. *G06T 13/40* (2013.01); *G06F 16/43* (2019.01); *G06F 40/221* (2020.01); *H04L 51/02* (2013.01); *G06N 20/00* (2019.01)

(58) Field of Classification Search
CPC ................................ G06T 13/40; G06F 16/43
See application file for complete search history.

(56) References Cited

U.S. PATENT DOCUMENTS

| 7,168,953 B1 | 1/2007 | Poggio et al. |
| 8,224,652 B2 | 7/2012 | Wang et al. |

(Continued)

FOREIGN PATENT DOCUMENTS

| CN | 101931621 A | 12/2010 |
| CN | 106355629 A | 1/2017 |

(Continued)

OTHER PUBLICATIONS

"Extended European Search Report Issued in European Patent Application No. 18926083.9", dated Jan. 31, 2022, 9 Pages.
(Continued)

*Primary Examiner* — Yi Yang
(74) *Attorney, Agent, or Firm* — Schwegman Lundberg & Woessner, P.A.

(57) ABSTRACT

The present disclosure provides method and apparatus for automatically generating motions of an avatar. A message in a session between a user and an electronic conversational agent may be obtained, the avatar being a visual representation of the electronic conversational agent. At least one facial animation and/or body animation may be determined based on at least one part of the message. At least one motion of the avatar may be generated based at least on the facial animation and/or the body animation.

17 Claims, 9 Drawing Sheets

(51) Int. Cl.
*G06F 40/221* (2020.01)
*H04L 51/02* (2022.01)
*G06N 20/00* (2019.01)

(56) References Cited

U.S. PATENT DOCUMENTS

| | | | |
|---|---|---|---|
| 2001/0051535 A1 | 12/2001 | Kamimura et al. | |
| 2005/0053359 A1* | 3/2005 | Jung | G11B 27/105 |
| 2007/0142965 A1* | 6/2007 | Lin | G06N 3/008 |
| | | | 700/245 |
| 2010/0082345 A1* | 4/2010 | Wang | G10L 13/00 |
| | | | 704/E21.02 |
| 2010/0318398 A1* | 12/2010 | Brun | G06Q 10/109 |
| | | | 705/7.18 |
| 2011/0115798 A1 | 5/2011 | Nayar et al. | |
| 2012/0130717 A1* | 5/2012 | Xu | G06T 13/40 |
| | | | 345/473 |
| 2013/0332320 A1 | 12/2013 | Nieto | |
| 2014/0143682 A1 | 5/2014 | Druck | |
| 2014/0320508 A1 | 10/2014 | Perez et al. | |
| 2016/0292131 A1 | 10/2016 | Langels et al. | |
| 2017/0278510 A1* | 9/2017 | Zhao | G06F 40/30 |
| 2019/0333118 A1* | 10/2019 | Crimmins | G06F 40/30 |

FOREIGN PATENT DOCUMENTS

| | | |
|---|---|---|
| CN | 106817349 A | 6/2017 |
| CN | 107257403 A | 10/2017 |
| CN | 107294838 A | 10/2017 |
| CN | 107340859 B | 4/2021 |
| WO | 2009077901 A1 | 6/2009 |

OTHER PUBLICATIONS

Egges, et al., "Generic Personality and Emotion Simulation for Conversational Agents", In Journal of Computer Animation and Virtual Worlds, vol. 15, Issue 1, Mar. 1, 2004, 39 Pages.

"Notice of Allowance Issued in Chinese Patent Application No. 201880072227.3", dated Mar. 9, 2022, 8 Pages.

"International Search Report and Written Opinion Issued in PCT Application No. PCT/CN18/095198", dated Apr. 9, 2019, 9 Pages.

Sadoughi, et al.,"Speech-Driven Animation with Meaningful Behaviors", In Journal of Computing Research Repository, Aug. 4, 2017, pp. 1-13.

Tanco, et al.,"Realistic Synthesis of Novel Human Movements from a Database of Motion Capture Examples", In Proceedings of Workshop on Human Motion, Dec. 7, 2000, 6 Pages.

Yang, et al.,"Facial Expression Recognition Using Emotion Avatar Image", In Proceedings of Ninth IEEE International Conference on Automatic Face and Gesture Recognition, Mar. 21, 2011, pp. 866-871.

Yang, et al.,"Understanding Discrete Facial Expressions in Video Using an Emotion Avatar Image", In Journal of IEEE Transactions on Systems, Man, and Cybernetics, Part B, vol. 42, Issue 4, Aug. 2012, pp. 980-992.

"First Office Action and Search Report Issued in Chinese Patent Application No. 201880072227.3", (w/ Concise Statement of Relevance), dated Sep. 17, 2021, 15 Pages.

"Office Action Issued in European Patent Application No. 18926083.9", dated Sep. 18, 2023, 6 Pages.

* cited by examiner

AUTOMATICALLY GENERATING MOTIONS OF AN AVATAR

CROSS-REFERENCE TO RELATED APPLICATION

This application is a U.S. National Stage Filing under 35 U.S.C. 371 of International Patent Application Serial No. PCT/CN2018/095198, filed Jul. 10, 2018, and published as WO 2020/010530 A1 on Jan. 16, 2020, which application and publication are incorporated herein by reference in their entirety.

BACKGROUND

Animation techniques are widely used for generating motions of virtual or physical avatars. For example, in order to generate a series of desired motions of an avatar, a series of animations corresponding to the desired motions may be created, and then the animations may be applied to the avatar to cause various parts of the avatar to move or act according to the animations, thus achieving the series of desired motions of the avatar.

SUMMARY

This Summary is provided to introduce a selection of concepts that are further described below in the Detailed Description. It is not intended to identify key features or essential features of the claimed subject matter, nor is it intended to be used to limit the scope of the claimed subject matter.

Embodiments of the present disclosure propose method and apparatus for automatically generating motions of an avatar. A message in a session between a user and an electronic conversational agent may be obtained, the avatar being a visual representation of the electronic conversational agent. At least one facial animation and/or body animation may be determined based on at least one part of the message. At least one motion of the avatar may be generated based at least on the facial animation and/or the body animation.

It should be noted that the above one or more aspects comprise the features hereinafter fully described and particularly pointed out in the claims. The following description and the drawings set forth in detail certain illustrative features of the one or more aspects. These features are only indicative of the various ways in which the principles of various aspects may be employed, and this disclosure is intended to include all such aspects and their equivalents.

BRIEF DESCRIPTION OF THE DRAWINGS

The disclosed aspects will hereinafter be described in connection with the appended drawings that are provided to illustrate and not to limit the disclosed aspects.

DETAILED DESCRIPTION

Figure 1:
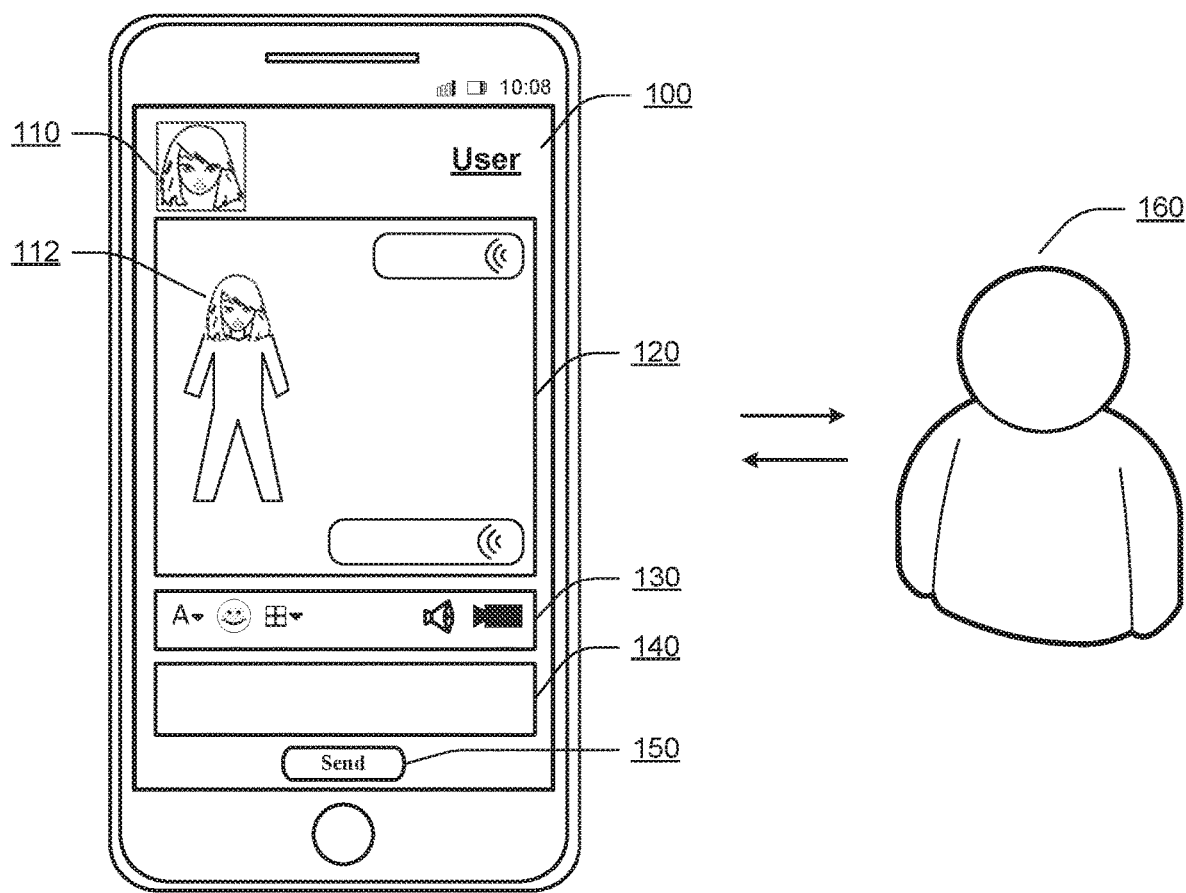
FIG. 1 illustrates an exemplary application scenario of a virtual avatar according to an embodiment.

The present disclosure will now be discussed with reference to several example implementations. It is to be understood that these implementations are discussed only for enabling those skilled in the art to better understand and thus implement the embodiments of the present disclosure, rather than suggesting any limitations on the scope of the present disclosure.

Usually, a lot of artificial works should be involved for generating motions of an avatar. For example, for each motion of the avatar, a designer or engineer needs to design one corresponding animation or a series of corresponding animations. Thus, when it is necessary to generate many motions of the avatar, artificial works as needed would be dramatically increased and efficiency of generating the motions of the avatar would be very low. Moreover, all the motions that the avatar can make shall be prepared in advance, and thus the avatar can only present a few amount of motions in actual application circumstances. Taking a realtime interaction circumstance as an example, e.g., in a case that the avatar is designed for talking with a user, a group of motions may be previously prepared with respect to certain contents. Thus, when any of the certain contents is talked, the avatar may make a corresponding motion previously prepared. However, since actually-talked topics are not limited to any certain range, the avatar may fail to make a motion corresponding to a currently-talked topic which is beyond said certain contents prepared for the avatar, thus the avatar cannot make motions in a realtime manner during talking with the user.

Embodiments of the present disclosure propose to automatically generate motions of an avatar in a realtime interaction circumstance. For example, during a session between a user and an electronic conversational agent, an avatar which is a visual representation of the electronic conversational agent may make corresponding motions in response to messages obtained in the session in a realtime manner, without the need of preparing the motions corresponding to the messages in advance. Moreover, since the motions of the avatar have a high relevance with the messages, the user's experience may be improved during talking with the electronic conversational agent.

Herein, the avatar may be a virtual avatar, e.g., digital avatar, virtual character, cartoon character, anthropomorphic avatar, etc., or may be a physical avatar, e.g., physical robot, etc. The avatar may have a face part, which comprises at least one of eyes, nose, mouth, face basement, etc., and may present various facial motions. The avatar may also have a body part, which comprises at least one of head, shoulders, hands, arms, legs, feet, etc., and may present various body motions. Herein, the electronic conversational agent may be, such as, a chatbot. Conventionally, a chatbot may conduct automated sessions with a user. Herein, "session" may refer to a time-continuous dialog between two chatting participants and may include messages from either chatting participant, e.g., a user or a chatbot.

According to the embodiments of the present disclosure, in response to obtaining a message in a session between a user and a chatbot, at least one animation may be determined accordingly. The animation may comprise facial animation and/or body animation. Herein, "animation" may refer to movement trajectories of various feature points in a face part or a body part based on various 3D reconstruction techniques. For example, an animation indicating a facial expression may be reconstructed by a linear combination of a plurality of (e.g., 48) basic facial expressions, each basic facial expression being characterized by a set of predetermined feature points in the face part. Moreover, for example, an animation indicating a body motion may be reconstructed by a set of predetermined feature points in the body part. The determined animation may be further applied to an avatar representative of the chatbot such that the avatar may make a motion accordingly. In this way, the avatar may make realtime motions associated with messages obtained in the session. Here, the "message" may be from the chatbot or the user. That is, on one hand, the avatar may make motions according to what the chatbot is going to speak, and on the other hand, the avatar may also make motions in response to what the user is speaking.

Various approaches may be adopted by the embodiments of the present disclosure for automatically determining animations in response to messages in the session and further generating motions of the avatar. The approaches may comprise, e.g., sequential motion parsing-based approach, retrieve-based approach, generation-based approach, etc., which will be discussed in details later. However, it should be appreciated that the present disclosure is not limited to any of these approaches, but may cover any other approaches for the purpose of automatically generating motions of an avatar in a realtime interaction circumstance.

FIG. 1 illustrates an exemplary application scenario of a virtual avatar according to an embodiment. The virtual avatar is a visual representation of an electronic conversational agent, e.g., a chatbot, and is presented in a user interface 100 of the chatbot.

The user interface 100 is displayed in a screen of a terminal device, e.g., a smart phone, and may comprise, e.g., a chatbot icon 110, a presentation area 120, a control area 130 and an input area 140. The chatbot icon 110 may be a photo or picture representing the chatbot. The presentation area 120 displays a chat window that contains messages in a session between a user 160 and the chatbot. The control area 130 includes a plurality of virtual buttons for the user 160 to perform message input settings. For example, the user 160 may select to make a voice input, attach image files, select emoji symbols, make a screenshot of the current screen, activate camera, etc. through the control area 130. The input area 140 is used by the user for inputting messages. For example, the user may type text through the input area 140. The user interface 100 may further comprise a virtual button 150 for confirming to send input messages. If the user touches the virtual button 150, the messages input in the input area 140 may be sent to the presentation area 120. The messages in the session between the user 160 and the chatbot may be in various formats, e.g., voice, text, etc. As shown in the presentation area 120, the user 160 is now chatting with the chatbot by voice. A virtual avatar 112 is presented in the presentation area 120, which is representative of the chatbot and may make facial motions and/or body motions in response to messages in the session.

It should be appreciated that all the elements and their layout shown in FIG. 1 are exemplary. Depending on specific application requirements, the user interface in FIG. 1 may omit or add any elements, and the layout of the elements in the user interface in FIG. 1 may also be changed in various approaches.

Figure 2:
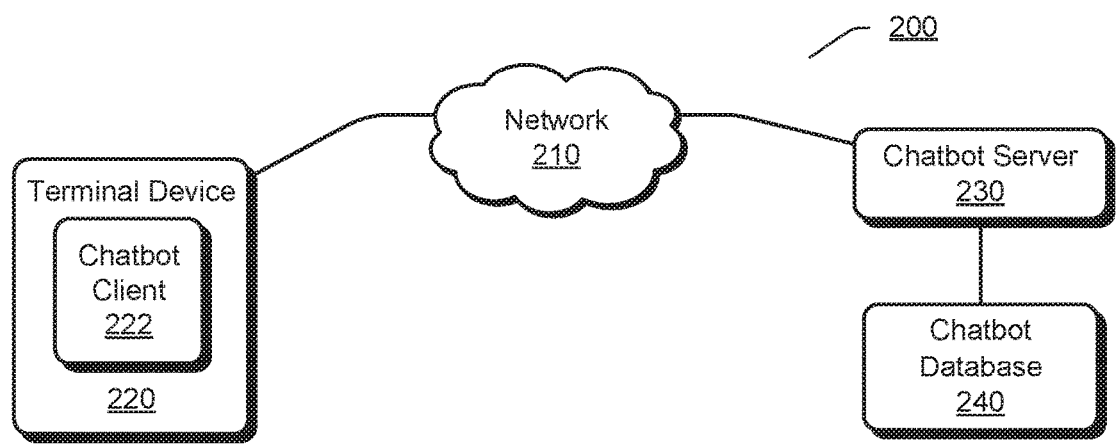
FIG. 2 illustrates exemplary system architecture under an application scenario of a virtual avatar according to an embodiment.

FIG. 2 illustrates exemplary system architecture 200 under an application scenario of a virtual avatar according to an embodiment. For example, the application scenario shown in FIG. 1 may be based on the system architecture 200.

In FIG. 2, a network 210 is applied for interconnecting among a terminal device 220 and a chatbot server 230.

The network 210 may be any type of networks capable of interconnecting network entities. The network 210 may be a single network or a combination of various networks. In terms of coverage range, the network 210 may be a Local Area Network (LAN), a Wide Area Network (WAN), etc. In terms of carrying medium, the network 210 may be a wireline network, a wireless network, etc. In terms of data switching techniques, the network 210 may be a circuit switching network, a packet switching network, etc.

The terminal device 220 may be any type of electronic computing devices capable of connecting to the network 210, assessing servers or websites on the network 210, processing data or signals, etc. For example, the terminal device 220 may be smart phones, desktop computers, laptops, tablets, AI terminals, wearable devices, smart TVs, etc. Although only one terminal device is shown in FIG. 2, it should be appreciated that a different number of terminal devices may connect to the network 210. The smart phone shown in FIG. 1 may be an example of the terminal device 220.

In an implementation, the terminal device 220 may be used by a user. The terminal device 220 may include a chatbot client 222 which may provide automated chatting service for the user. The chatbot client 222 may interact with the user through a user interface. In some cases, the chatbot client 222 may interact with the chatbot server 230. For example, the chatbot client 222 may transmit messages input by the user to the chatbot server 230, receive responses associated with the messages from the chatbot server 230, and provide the responses to the user. The chatbot server 230 may connect to or incorporate a chatbot database 240. The chatbot database 240 may comprise information that can be used by the chatbot server 230 for generating responses. However, it should be appreciated that, in other cases, instead of interacting with the chatbot server 230, the chatbot client 222 may also locally generate responses to messages input by the user.

In some implementations, during the chatbot client 222 provides automated chatting service for the user, the chatbot client 222 may present a virtual avatar to the user through a user interface, wherein the virtual avatar may make motions in response to messages in a session between the user and the chatbot. The motions of the virtual avatar may be generated by the chatbot server 230 or by the chatbot client 222 locally.

It should be appreciated that all the entities or units shown in FIG. 2 are exemplary, and depending on specific application requirements, any other entities or units may be involved in the system architecture 200.

Figure 3:
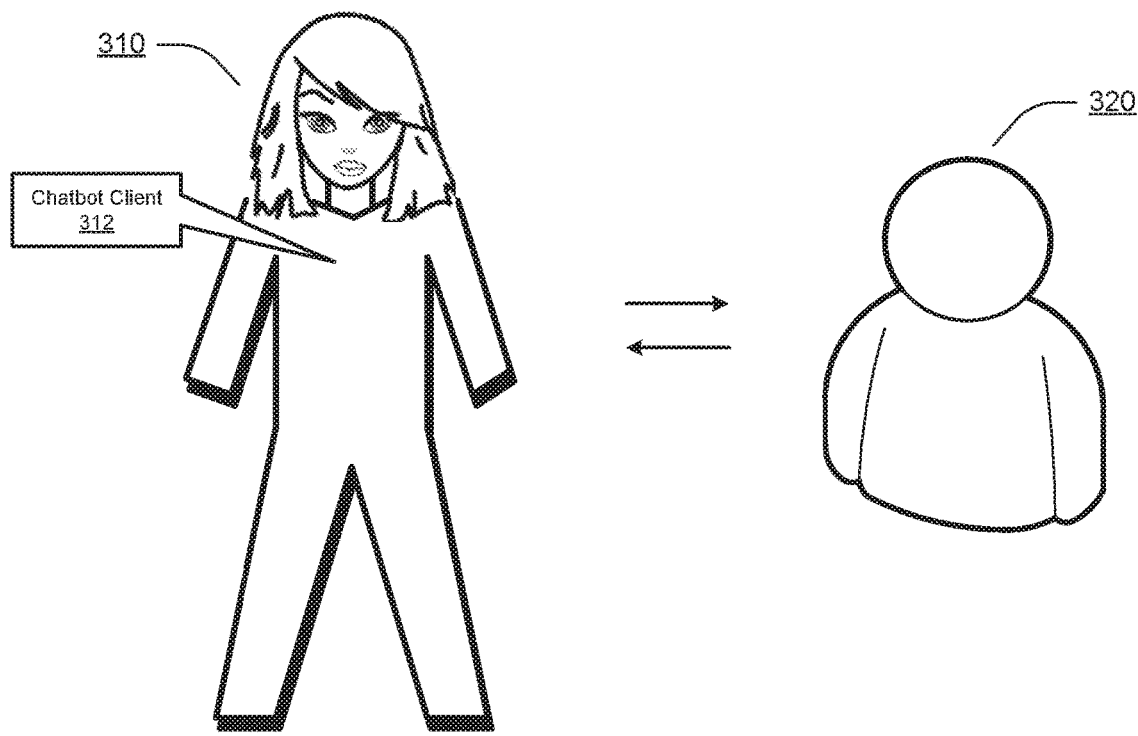
FIG. 3 illustrates an exemplary application scenario of a physical avatar according to an embodiment.

FIG. 3 illustrates an exemplary application scenario of a physical avatar according to an embodiment. A physical avatar 310 may be a physical robot having various mechanical units for difference parts, e.g., face part, body part, etc. These mechanical units are provided for enabling the physical avatar 310 to make various facial motions and/or body motions in a way similar with human beings.

The physical avatar 310 is a visual representation of an electronic conversational agent, e.g., a chatbot. For example, a chatbot client 312 may be installed or run inside the physical avatar 310. Thus, the physical avatar 310 may chat with a user 320 through the chatbot client 312. During a session between the user 320 and the chatbot, the physical avatar 310 may make facial motions and/or body motions in response to messages in the session.

It should be appreciated that the physical avatar shown in FIG. 3 is exemplary. Depending on specific application requirements, the physical avatar in FIG. 3 may be designed in various ways, e.g., only having the face part and the upper body part, having a different figure, having a different face part, etc.

Figure 4:
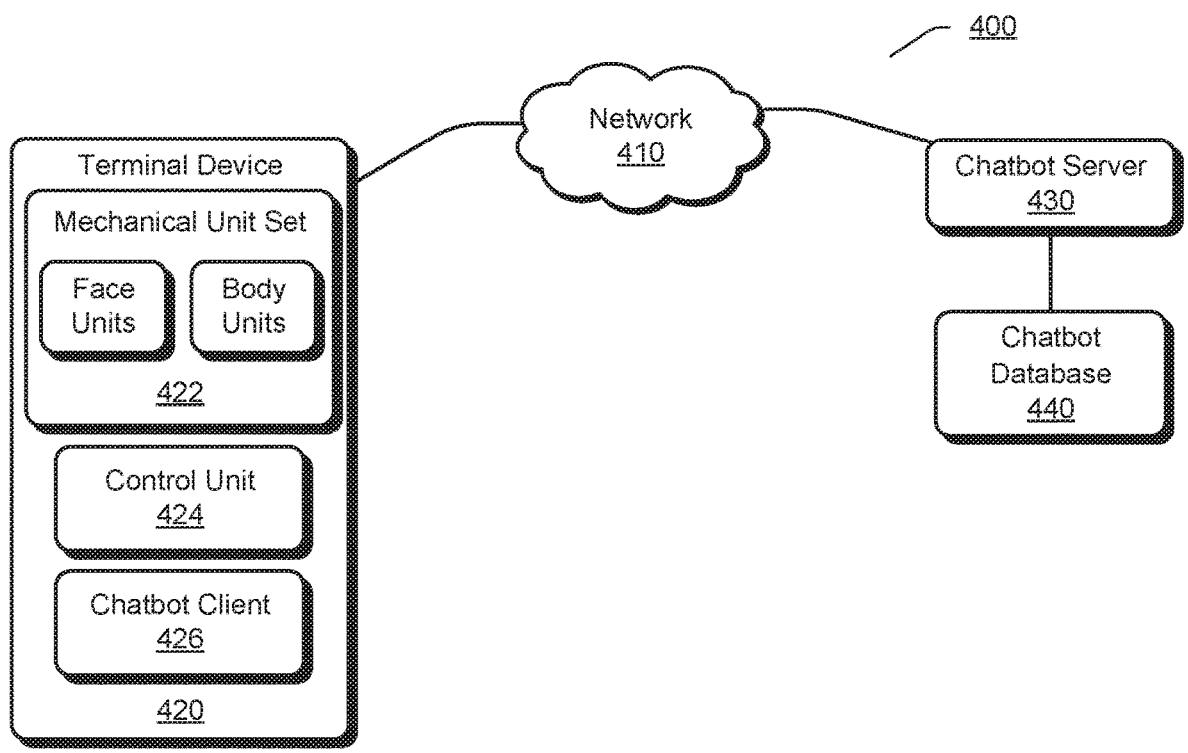
FIG. 4 illustrates exemplary system architecture under an application scenario of a physical avatar according to an embodiment.

FIG. 4 illustrates exemplary system architecture 400 under an application scenario of a physical avatar according to an embodiment. For example, the application scenario shown in FIG. 3 may be based on the system architecture 400.

In FIG. 4, a network 410 is applied for interconnecting among a terminal device 420 and a chatbot server 430. The network 410 is similar with the network 210 in FIG. 2.

The terminal device 420 may be any type of mechanical devices having computing and processing capabilities. The terminal device 420 is designed as a physical avatar, which has various mechanical units for difference parts of the physical avatar. For example, the terminal device 420 may comprise a mechanical unit set 422 which comprises a plurality of facial mechanical units and/or a plurality of body mechanical units. The facial mechanical units correspond to at least one of eyes, nose, mouth, face basement, etc., of the physical avatar, and the body mechanical units correspond to at least one of head, shoulders, hands, arms, legs, feet, etc., of the physical avatar. The mechanical unit set 422 may present various facial motions and/or various body motions in a way similar with human beings under a control by a control unit 424 in the terminal device 420.

The terminal device 420 may include a chatbot client 426 which may provide automated chatting service for the user. The chatbot client 426 may interact with a user through a user interface. In some cases, the chatbot client 426 may interact with the chatbot server 430 to obtain responses to messages input by the user. The chatbot server 430 may connect to or incorporate a chatbot database 440. The chatbot database 440 may comprise information that can be used by the chatbot server 430 for generating responses. Alternatively, instead of interacting with the chatbot server 430, the chatbot client 426 may also locally generate responses to messages input by the user.

In some implementations, during the chatbot client 426 provides automated chatting service for the user, animations may be determined in response to messages in a session, and the determined animations may be used by the control unit 424 to control the mechanical unit set 422, such that the physical avatar may make motions accordingly. The animations may be determined by the chatbot server 430 or by the chatbot client 426 locally.

It should be appreciated that all the entities or units shown in FIG. 4 are exemplary, and depending on specific application requirements, any other entities or units may be involved in the system architecture 400.

Moreover, it should be appreciated that a virtual avatar, e.g., the virtual avatar 112 in FIG. 1, and a physical avatar, e.g., the physical avatar 310 in FIG. 3, may also be combined together. For example, a new avatar may be formed with the face part of the virtual avatar 112 in FIG. 1 and the body part of the physical avatar 310 in FIG. 3. Thus, this new avatar may have a virtual face part shown in a screen and a physical body part constructed by mechanical units, wherein motions of the virtual face part may be generated based on the following discussed process related to a virtual avatar, and motions of the physical body part may be generated based on the following discussed process related to a physical avatar.

Figure 5:
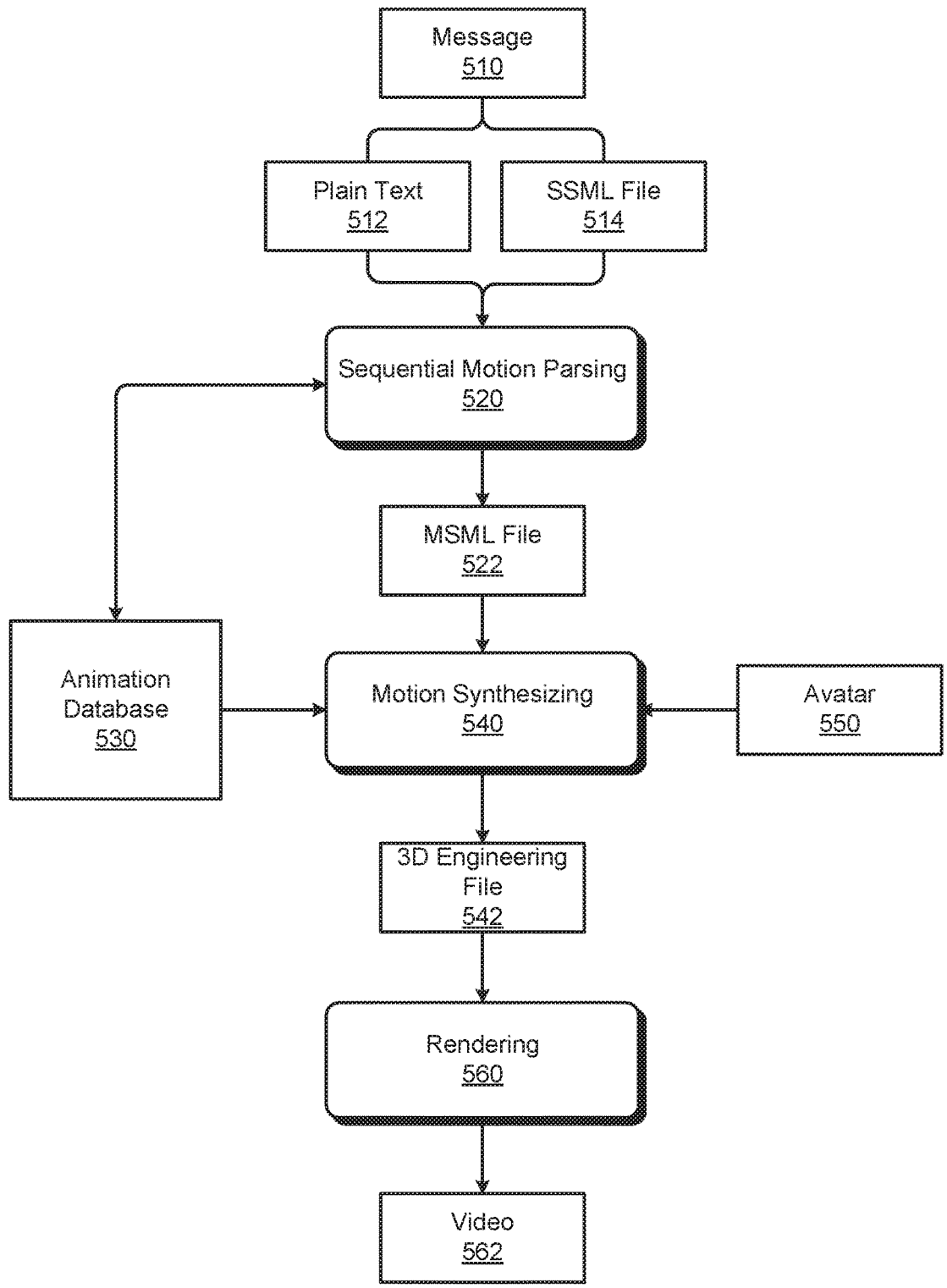
FIG. 5 illustrates an exemplary process for automatically generating motions of a virtual avatar through sequential motion parsing according to an embodiment.

FIG. 5 illustrates an exemplary process 500 for automatically generating motions of a virtual avatar through sequential motion parsing according to an embodiment. According to the process 500, a sequential motion parsing-based approach is applied for automatically determining one or more animations in response to a message in a session between a user and a chatbot, and further generating motions of the virtual avatar.

A message 510 may be obtained in the session between the user and the chatbot. The message 510 may be from the user or the chatbot. The following discussion is provided in an assumption that the message 510 is from the chatbot. That is, the following discussion focuses on automatically generating motions of the avatar that correspond to content the chatbot is going to speak in the session.

At 520, sequential motion parsing may be performed on the message 510. In an implementation, the sequential motion parsing may be performed on a plain text 512 obtained from the message 510. If the message 510 is in a text format, the plain text 512 may be obtained from the message 510 directly. If the message 510 is in a voice format, the voice message 510 may be converted into the plain text 512 through a voice-to-text conversion. In another implementation, the sequential motion parsing may be performed on a Speech Synthesis Markup Language (SSML) file 514 obtained from the message 510. SSML is a well-known voice synthesizing technique which may mark up various voice attributes for a text so as to characterize a voice corresponding to the text. A SSML file obtained through the SSML technique may comprise, e.g., a plurality of segments of a text, prosody of each segment, pitch of each segment, etc. If the message 510 is in a voice format, the SSML file 514 may be obtained based on the voice message 510 through the SSML technique.

The sequential motion parsing may be performed for determining one or more facial animations and/or body animations corresponding to the message 510. In an implementation, the sequential motion parsing may utilize a pre-established animation database 530 for determining the facial animations and/or the body animations.

Figure 6:
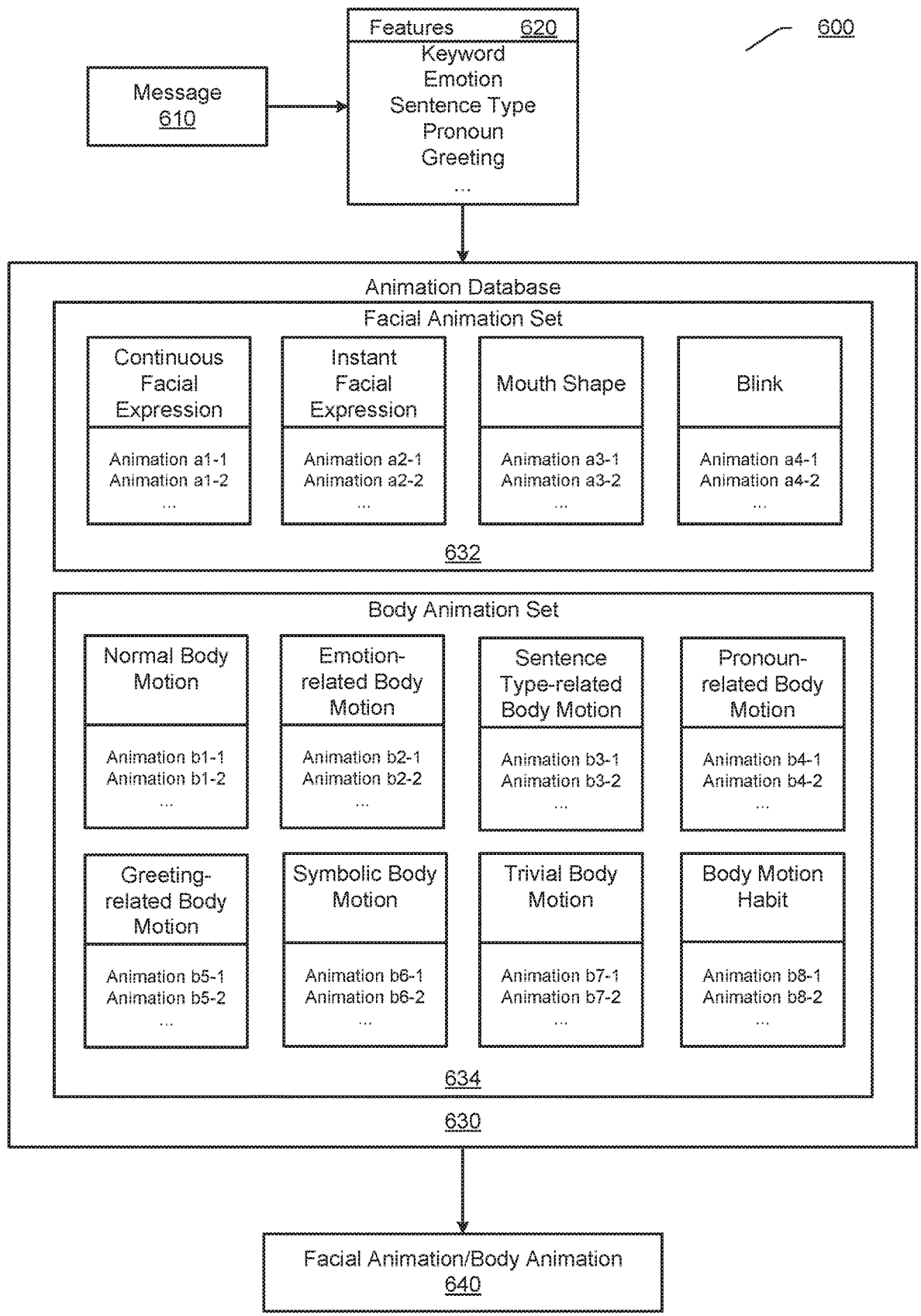
FIG. 6 illustrates an exemplary process for determining animations from an animation database through sequential motion parsing according to an embodiment.

FIG. 6 illustrates an exemplary process 600 for determining animations from an animation database through sequential motion parsing according to an embodiment. According to the process 600, the sequential motion parsing may be performed on at least a part of a message 610 so as to determine facial animation and/or body animation from an animation database 630, wherein the message 610 and the animation database 630 correspond to the message 510 and the animation database 530 in FIG. 5 respectively.

Although it is shown in FIG. 6 that the message 610 is processed by the sequential motion parsing, the sequential motion parsing may be performed on a plain text or a SSML file obtained from the message 610 indeed.

A plurality of features 620 may be obtained from the message 610 through the sequential motion parsing. These features 620 may be used by the sequential motion parsing for determining corresponding animations.

In an implementation, the features 620 may comprise keywords in the message 610. In this disclosure, "word" is used for collectively referring to character, word, phrase, etc. in various language families. Herein, a "keyword" may refer to one or more words for which one or more corresponding animations have been collected or created in the animation database 630. For example, a keyword "glad" may correspond to at least a facial animation indicating grinning in the face part. For example, a keyword "very surprised" may correspond to at least a facial animation indicating opening mouth and eyes largely in the face part, and may further correspond to a body animation indicating opening arms and hands in the body part.

In an implementation, the features 620 may comprise an emotion of the message 610. The emotion may be one of a plurality of emotion categories, e.g., happy, angry, sad, disgust, surprise, fear, contempt, neutral, etc. The emotion of the message 610 may be determined through various existing emotion analyzing approaches, e.g., neural network classifiers for predicting an emotion of a text. The animation database 630 may comprise animations corresponding to various emotion categories. For example, the emotion "fear" may correspond to at least a body animation indicating holding breast with hands in the body part. For example, the emotion "angry" may correspond to at least a facial animation indicating frowning, glaring and curling lips in the face part, together with a body animation indicating stamping foot in the body part.

In an implementation, the features 620 may comprise a sentence type of the message 610. Herein, "sentence type" may refer to whether a sentence in the message 610 is an affirmative, negative or interrogative sentence. Each sentence type may correspond to different animations. For example, an affirmative sentence may correspond to at least a body animation indicating nodding in the body part. For example, a negative sentence may correspond to at least a facial animation indicating closing mouth tightly in the face part and a body animation indicating shaking head and hands in the body part. For example, an interrogative sentence may correspond to at least a facial animation indicating frowning and opening mouth slightly in the face part and a body animation indicating tilting head in the body part.

In an implementation, the features 620 may comprise a pronoun in the message 610. The pronoun may be "I", "you", etc. Each type of pronoun may correspond to different animations. For example, the pronoun "I" may correspond to at least a body animation indicating pointing to the face by a finger. For example, the pronoun "you" may correspond to at least a body animation indicating pointing to the user by a finger.

In an implementation, the features 620 may comprise a greeting in the message 610. The greeting may be "Hi", "Byebye", etc. Each type of greeting may correspond to different animations. For example, the greeting "Hi" may correspond to at least a body animation indicating leaning forward and nodding in the body part. For example, the greeting "Byebye" may correspond to at least a body animation indicating bringing arm up and shaking hand in the body part.

It should be appreciated that the features 620 may comprise at least one of the above-discussed features, and may also comprise any other features facilitating for determining animations.

The animation database 630 may comprise a large number of animations that are stored in the animation database 630 for selection by the sequential motion parsing. These animations may be obtained from various animation sources or created artificially in advance.

The animation database 630 may comprise a facial animation set 632. The facial animation set 632 comprises various facial animations corresponding to different facial motions. The facial animations in the facial animation set 632 may be classified into, e.g., a continuous facial expression subset, an instant facial expression subset, a mouth shape subset, a blink subset, etc. according to different aspects for presenting facial motions.

A continuous facial expression refers to a facial expression that may continue for a relatively long time, e.g., continuing during a sentence, continuing among more than one sentence, etc. The continuous facial expression may be associated with a message or a context of the message, and intends to reflect, e.g., a holistic emotion of the message or the context. For example, if a pleasant travel is described in one or more messages, a continuous facial expression corresponding to emotion "happy" may be continuously presented in the face part during the one or more messages. The continuous facial expression subset may comprise a number of animations, e.g., animation a1-1, animation a1-2, etc., which correspond to various continuous facial expressions respectively. In an implementation, the animations in the continuous facial expression subset may correspond to facial expressions reflecting various emotions. For example, assuming that the animation a1-1 corresponds to a facial expression reflecting emotion "happy", the animation a1-1 may indicate a facial motion of squinting and grinning in the face part.

An instant facial expression refers to a facial expression that only continues for a relatively short time, e.g., continuing during one or more words, etc. The instant facial expression may be associated with at least one part of a message, and intends to present a facial motion in response to the content of this part of the message. For example, if a keyword "Wow" occurs in a message, an instant facial expression corresponding to emotion "surprise" may be presented in the face part during the keyword. For example, if a keyword "how about" occurs in a message to indicate that this is an interrogative sentence, an instant facial expression corresponding to an interrogative sentence type may be presented in the face part during this keyword or one or more following words. The instant facial expression subset may comprise a number of animations, e.g., animation a2-1, animation a2-2, etc., which correspond to various instant facial expressions respectively. In an implementation, the animations in the instant facial expression subset may correspond to facial expressions reflecting various emotions, various sentence types, etc. For example, assuming that the animation a2-2 corresponds to a facial expression reflecting an interrogative sentence type, the animation a2-2 may indicate a facial motion of frowning and opening mouth slightly in the face part.

The mouth shape subset may comprise a number of animations, e.g., animation a3-1, animation a3-2, etc., which indicate various mouth shapes corresponding to various words respectively. Various existing techniques may be adopted for creating an animation simulating a mouth shape corresponding to a certain word.

The blink subset may comprise a number of animations, e.g., animation a4-1, animation a4-2, etc., which correspond to various blink manners respectively. For example, the animation a4-1 may indicate a quick blink, while the animation a4-2 may indicate a slow blink, etc.

The animation database 630 may comprise a body animation set 634. The body animation set 634 comprises various body animations corresponding to different body motions. The body animations in the body animation set 634 may be classified into, e.g., a normal body motion subset, an emotion-related body motion subset, a sentence type-related body motion subset, a pronoun-related body motion subset, a greeting-related body motion subset, a symbolic body motion subset, a trivial body motion subset, a body motion habit subset, etc. according to different aspects for presenting body motions.

The normal body motion subset may comprise a number of animations, e.g., animation b1-1, animation b1-2, etc., which correspond to various normal body motions respectively. A normal body motion refers to a body motion that may continue for a relative long time if no other body motion needs to be made. In an implementation, normal body motions may comprise body motions when speaking or body motions when listening, e.g., putting hands at the back, putting hands in the front, putting hands by the sides, etc.

The emotion-related body motion subset may comprise a number of animations, e.g., animation b2-1, animation b2-2, etc., which correspond to various emotion-related body motions respectively. An emotion-related body motion refers to a body motion that may reflect a certain emotion. For example, a body motion of holding breast with hands may correspond to the emotion "fear", a body motion of swinging arm back and stamping foot may correspond to the emotion "very angry", etc.

The sentence type-related body motion subset may comprise a number of animations, e.g., animation b3-1, animation b3-2, etc., which correspond to various sentence type-related body motions respectively. A sentence type-related body motion refers to a body motion that is associated with a sentence type of a message. For example, a body motion of shaking head and hands may correspond to a negative sentence, a body motion of tilting head may correspond to an interrogative sentence, a body motion of nodding may correspond to an affirmative sentence, etc.

The pronoun-related body motion subset may comprise a number of animations, e.g., animation b4-1, animation b4-2, etc., which correspond to various pronoun-related body motions respectively. A pronoun-related body motion refers to a body motion that is associated with a pronoun in a message. For example, a body motion of pointing to the face by a finger may correspond to the pronoun "I", a body motion of pointing to the user by a finger may correspond to the pronoun "you", etc.

The greeting-related body motion subset may comprise a number of animations, e.g., animation b5-1, animation b5-2, etc., which correspond to various greeting-related body motions respectively. A greeting-related body motion refers to a body motion that is associated with a greeting in a message. For example, a body motion of leaning forward and nodding may correspond to the greeting "Hi", a body motion of bringing arm up and shaking hand may correspond to the greeting "Byebye", etc.

The symbolic body motion subset may comprise a number of animations, e.g., animation b6-1, animation b6-2, etc., which correspond to various symbolic body motions respectively. A symbolic body motion refers to a body motion that is used for expressing a certain meaning with a predefined pattern. An exemplary type of symbolic body motions may be "acting cute", e.g., a body motion of pluming up cheeks and putting one finger in front of mouth, etc. Another exemplary type of symbolic body motions may be "posing for taking a picture", e.g., a body motion of raising arm up and making hand form a V-shape, etc.

The trivial body motion subset may comprise a number of animations, e.g., animation b7-1, animation b7-2, etc., which correspond to various trivial body motions respectively. The trivial body motions may comprise, e.g., scratching head, rubbing eyes, etc.

The body motion habit subset may comprise a number of animations, e.g., animation b8-1, animation b8-2, etc., which correspond to various body motion habits of the avatar respectively. The body motion habits may be predefined for the avatar to reflect some motion habits of the avatar, e.g., raising arm up when speaking, tilting head when listening, etc.

It should be appreciated that all the animation sets and subsets in the animation database 630 discussed above are exemplary, any of these sets and subsets may be omitted, replaced, combined or divided, and any other sets or subsets or animations may be added into the animation database 630. Moreover, in order to provide various types of animations as much as possible, the classifications in the animation database 630 may be further refined. Taking the emotion-related body motion subset as an example, this subset may be further divided into a plurality of groups based on different emotions, e.g., a group related to the emotion "angry", a group related to the emotion "sad", etc. A certain group may be further divided into several subgroups, and each subgroup may comprise one or more corresponding animations. For example, for the group related to the emotion "angry", this group may be further divided into several subgroups based on different degrees of "angry", e.g., a subgroup of "fury", a subgroup of "rage", a subgroup of "annoyed", etc., and each subgroup may comprise animations representing a corresponding degree of "angry".

According to the process 600, the features 620 obtained from the message 610 may be used by the sequential motion parsing for determining facial animation and/or body animation 640 from the animation database 630. The sequential motion parsing may utilize a single feature in the features 620 or a combination of two or more features in the features 620 for determining the facial animation and/or body animation 640 that are associated with the message 610.

Assuming that the message 610 comprises an exemplary sentence "I really get mad". In an aspect, an emotion category of this message may be detected as "angry", a continuous facial expression corresponding to the emotion "angry" may be determined to be applied during this message. Accordingly, an exemplary facial animation indicating frowning may be selected from the continuous facial expression subset in the facial animation set 632. In another aspect, the word "mad" in the message may be a keyword that can cause a corresponding instant facial expression. Accordingly, an exemplary facial animation indicating glaring, opening nostril widely, and closing mouth tightly may be selected from the instant facial expression subset in the facial animation set 632. Meanwhile, for the keyword "mad", an exemplary body animation indicating stamping foot may also be selected from the emotion-related body motion subset in the body animation set 630. In another aspect, animations indicating mouth shapes of the words "I", "really", "get" and "mad" may be selected from the mouth shape subset in the facial animation set 632. In another aspect, when detecting that the word "I" in the message is a pronoun, an exemplary animation indicating pointing to the face by a finger may be selected from the pronoun-related body motion subset in the body animation set 634. In another aspect, if the avatar has a predefined body motion habit of raising arm up when speaking, an animation indicating such body motion may be selected from the body motion habit subset in the body animation set 630. Any or all of the above facial animations and body animations may be combined together to be applied for the message 610.

The process 600 in FIG. 6 may be adopted by the sequential motion parsing in FIG. 5 for determining one or more facial animations and/or body animations corresponding to the message 510 in FIG. 5.

It should be appreciated that, according to the process 500 in FIG. 5, the sequential motion parsing may further determine time periods of the determined facial animations and/or body animations. That is, the sequential motion parsing may further specify a start time and an end time of each animation relative to words in the message 510.

Regarding a continuous facial expression, its corresponding animation may start before the message or start at the beginning of the message, and may end after the message or at the end of the message.

Regarding an instant facial expression triggered by a keyword in the message, its corresponding animation may start before, at the beginning of, or after the keyword in the message. In an implementation, the instant facial expression and the continuous facial expression may be exclusive from each other, e.g., these two types of facial expressions cannot occur concurrently. In an implementation, the instant facial expression may have a higher priority than the continuous facial expression. For example, during presenting a continuous facial expression, if an instant facial expression is determined to be presented, the continuous facial expression shall be interrupted and the instant facial expression is presented instead, after completing the presenting of the instant facial expression, the continuous facial expression may resume again. In an implementation, the instant facial expression may cause a mandatory waiting period to be added inside the message, wherein the mandatory waiting period ensures that the instant facial expression can be presented completely.

Regarding a mouth shape for a word in the message, its corresponding animation may synchronize with the word exactly. Accordingly, a series of mouth shapes corresponding to all the words in the message may start at the beginning of the message, and may end at the end of the message. Alternatively, if the avatar is not speaking for a time period, an animation indicating a mouth shape of closing mouth may be applied during this time period.

Regarding blink, its corresponding animation may be applied in a random way in terms of timing. Alternatively, animations indicating blink may also be applied as the change of rhythm of chatting. For example, if the message is speaking out by the avatar in a rapid speed, frequent blinks may be applied during the message.

Regarding a body motion triggered by the message or a keyword in the message, its corresponding animation may start before, at the beginning of, or after the message or the keyword, and may end during or after the message or the keyword. Alternatively, if the body motion is not triggered by any specific word in the message, such as, a normal body motion, a symbolic body motion, a trivial body motion or a body motion habit, its corresponding animation may also be applied in a random way.

Figure 7:
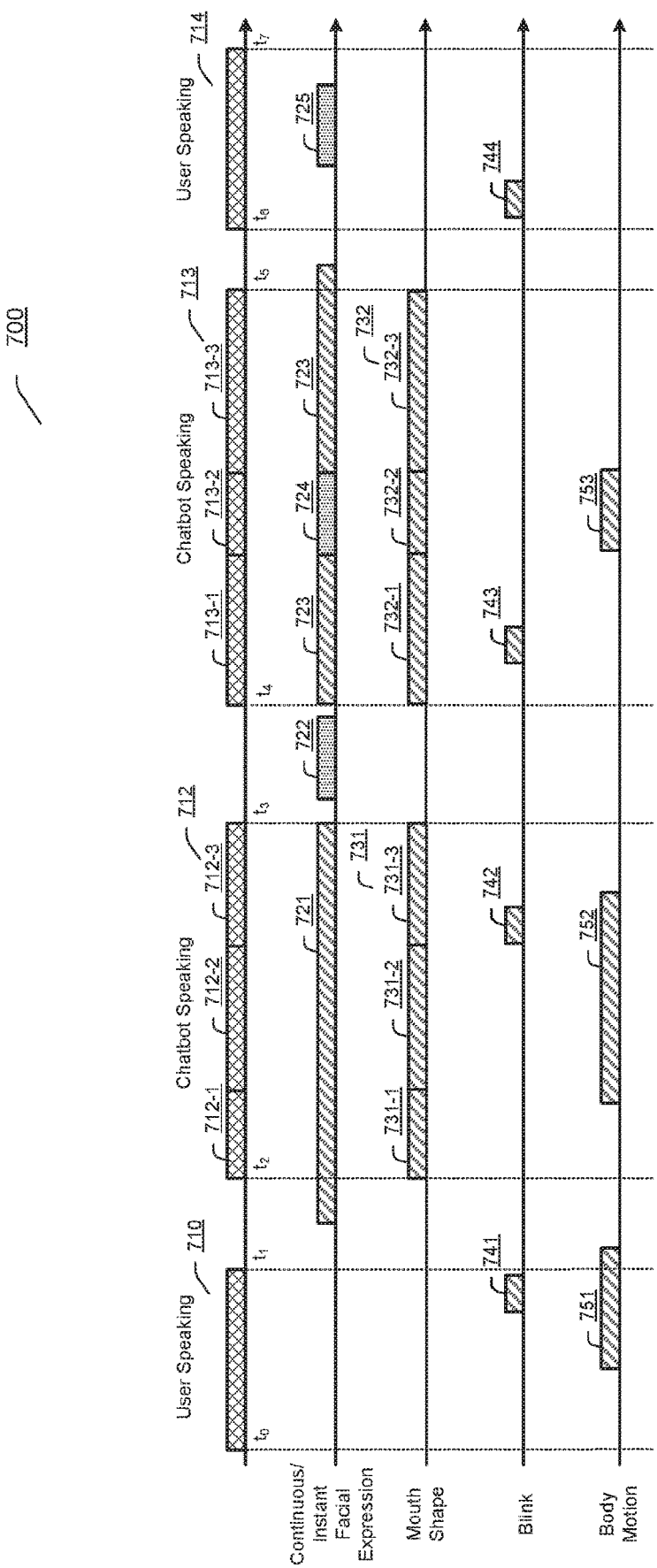
FIG. 7 illustrates an exemplary sequence diagram of various animations according to an embodiment.

FIG. 7 illustrates an exemplary sequence diagram 700 of various animations according to an embodiment. The sequence diagram 700 is based on an exemplary session between a user and a chatbot which comprises, in a time sequence, a message 710 from the user between a time point $t_0$ and a time point $t_1$, a message 712 from the chatbot between $t_2$ and $t_3$, a message 713 from the chatbot between $t_4$ and $t_5$, and a message 714 from the user between $t_6$ and $t_7$. The sequence diagram 700 shows time periods of various animations that are applied for the messages in the session.

The message 712 spoken by the chatbot may comprise three exemplary words 712-1, 712-2, 712-3. A continuous facial expression 721 may be determined for the message 712, which starts before the message 712 and ends at the end of the message 712. Three mouth shapes 731-1, 731-2, 731-3 are determined for the three words 712-1, 712-2, 712-3 respectively, and synchronize with the words exactly. A blink 742 is determined to be applied within the message 712. Moreover, a body motion 752 is determined based at least on the word 712-1, which starts during the word 712-1 and ends during the word 712-3. An instant facial expression 722 is determined for the message 712, which starts after the message 712.

The message 713 spoken by the chatbot may comprise three exemplary words 713-1, 713-2, 713-3. A continuous facial expression 723 may be determined for the message 713, which starts at the beginning of the message 713 and ends after the message 713. An instant facial expression 724 is determined based at least on, e.g., the word 713-2 in the message 713, which synchronizes with the word 713-2 and causes the continuous facial expression 723 to be interrupted during the word 713-2. Three mouth shapes 732-1, 732-2, 732-3 are determined for the three words 713-1, 713-2, 713-3 respectively, and synchronize with the words exactly. A blink 743 is determined to be applied within the message 713. Moreover, a body motion 753 is determined based at least on the word 713-2, which synchronizes with the word 713-2.

It should be appreciated that the sequence diagram 700 is exemplary, which only intends to give some examples showing time periods of various animations indicating facial motions and body motions. Depending on specific application requirements, any changes may be made in the sequence diagram 700.

Returning back to FIG. 5, after the sequential motion parsing obtains the one or more facial animations and/or body animations together with time periods of the facial animations and/or body animations, the facial animations and/or body animations may be further synthesized with the virtual avatar 550 so as to generate motions of the avatar corresponding to the message 510.

In an alternative implementation, a Motion Synthesis Markup Language (MSML) file 522 may be generated by the sequential motion parsing. The MSML file 522 may comprise indications of the facial animations and/or body animations, wherein the "indications" of the facial animations and/or body animations may be indices of the animations in the animation database 530. The MSML file 522 may further comprise time periods of the facial animations and/or body animations. Thus, the motions of the avatar may also be generated based on the MSML file 522. Herein, MSML is a well-known motion markup technique which may mark up various motions for a text. A MSML file obtained through the MSML technique may comprise, e.g., a plurality of segments of a text, animation determined for a segment, time period of each animation, emotion of the text, etc.

At 540, motion synthesizing may be performed on the determined facial animations and/or body animations and the virtual avatar 550. For example, the motion synthesizing may be performed based on the MSML file 522, wherein the motion synthesizing may extract animation data from the animation database 530 according to the indications of the animations in the MSML file 522, and apply the animations according to the time periods of these animations indicated in the MSML file 522. In an implementation, any existing 3D structure merging techniques may be adopted by the motion synthesizing, which can apply the determined facial animations and/or body animations to the virtual avatar to generate corresponding motions of the virtual avatar.

A 3D engineering file 542 may be output by the motion synthesizing, which comprises various information needed for generating visual motions of the avatar. At 560, a rendering process may be performed according to the 3D engineering file 542 so as to generate a video 562. The video 562 may present the motions of the avatar in a visual way.

In an implementation, if the message 510 is in a text format, the process 500 may further comprise convert the message 510 into voice, and incorporate the voice into the video 562. Thus, the motions of the avatar and the audio may be presented together.

It should be appreciated that various improvements may be made to the process 500. In an implementation, a shot change function may be added into the process 500. For example, depending on the motions of the avatar, various shot changes, e.g., zooming in, zooming out, rotating, etc., may be made such that the motions of the avatar may be further emphasized, better presented, etc. The shot change function may be implemented in, e.g., the 3D engineering file.

The above discussion in connection with FIG. 5 is provided in the assumption that the message 510 is from the chatbot. However, it should be appreciated that, the process 500 may be applied in a similar way even if the message 510 is from the user. That is, the process 500 may also be performed for automatically generating motions of the avatar that correspond to content the user is speaking in the session, merely with a need of making a few adaptions to the process 500. Next, such adaptions to the process 500 in the case that the message is from the user will be discussed.

In an aspect, since the message 510 is from the user, there is no need to determine, e.g., animations indicating mouth shapes corresponding to the words in the message 510, animations indicating pronoun-related body motions, etc.

In an aspect, time periods of the determined facial animations and/or body animations may be determined in consideration of the message 510 that is spoken by the user. For example, a continuous facial expression or an instant facial expression may start during the message or after the message, a body motion may start during the message or after the message, etc. Referring to FIG. 7, the message 710 is spoken by the user. A blink 741 is determined to be applied within the message 710. Moreover, a body motion 751 is determined based on at least a part of the message 710, which starts during the message 710 and ends after the message 710. The message 714 is spoken by the user. An instant facial expression 725 is determined based on at least a part of the message 714, which starts and ends during the message 714. Moreover, a blink 744 is determined to be applied within the message 714.

In an aspect, since the message 510 is from the user, there is no need to add voice corresponding to the message 510 into the video 562.

The approach of automatically generating motions of an avatar through the sequential motion parsing has been discussed above in connection with FIG. 5-FIG. 7. The functions achieved by the sequential motion parsing may be implemented by various technical means.

In an implementation, the sequential motion parsing may be implemented by a rule-based model. The rule-based model may define a set of rules that can map features obtained from a message, e.g., the features 620 in FIG. 6, to corresponding animations in an animation database. Referring to the above discussion for FIG. 6, the features 620 may individually or conjunctively indicate corresponding animations, and the animations in the animation database 630 may also possess corresponding feature attributes. Accordingly, such relationship between the features and the animations may be captured by the rule-based model to create a set of rules. Various techniques may be adopted by the rule-based model, e.g., Rocchio algorithm, text mining method, etc. After established, the rule-based model may be configured for determining facial animation and/or body animation from an animation database, through applying the set of predefined rules on at least a part of a message.

In an implementation, the sequential motion parsing may be implemented by a machine learning model. The machine learning model may be configured for determining facial animation and/or body animation from an animation database, through performing sequence tagging on a message. Herein, "sequence tagging" may refer to label each word in the message and label an animation corresponding to the word. The machine learning model may be based on neural-network, e.g., pointer network, and/or based on Conditional Random Field (CRF). The training data for the machine learning model may come from a set of mapping relationship between features from the message and animations in the animation database as discussed above.

In an implementation, the sequential motion parsing may also be implemented by a joint model which is based on a combination of the rule-based model and the machine learning model.

Figure 8:
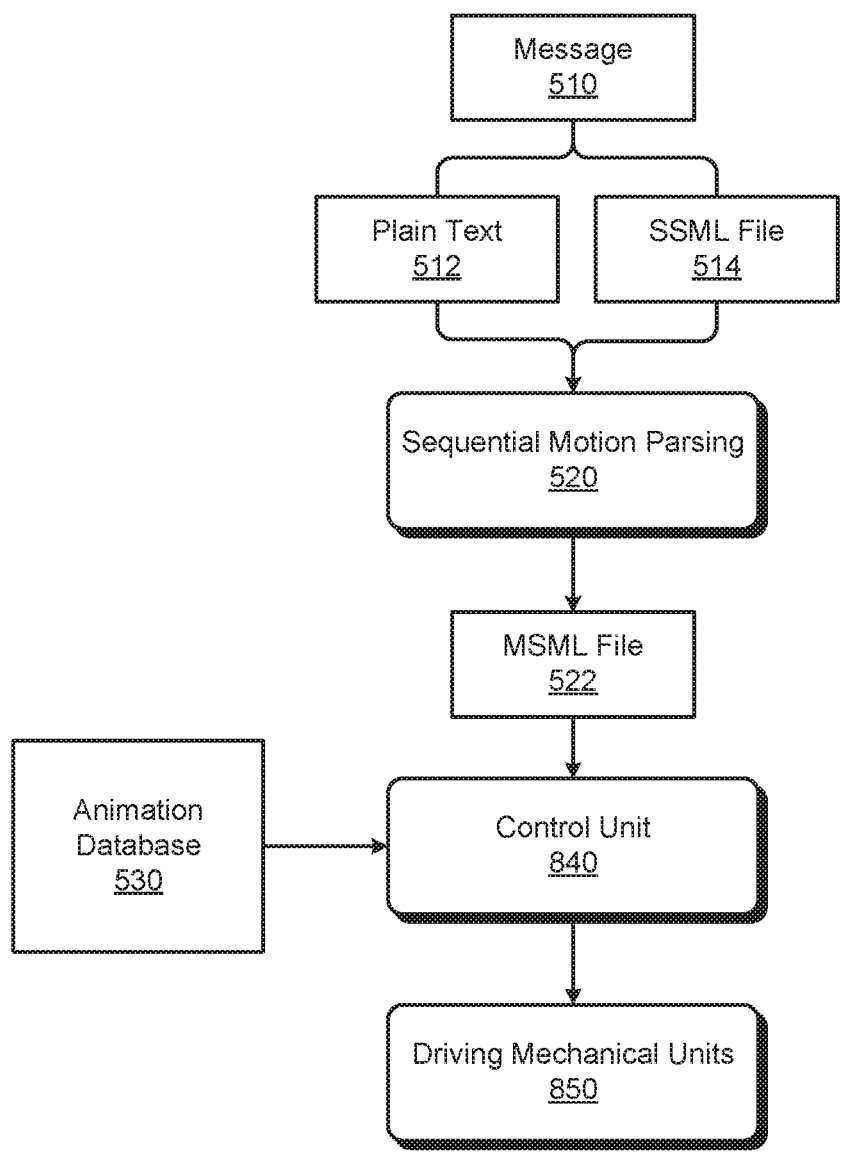
FIG. 8 illustrates an exemplary process for automatically generating motions of a physical avatar through sequential motion parsing according to an embodiment.

FIG. 8 illustrates an exemplary process 800 for automatically generating motions of a physical avatar through sequential motion parsing according to an embodiment. According to the process 800, a sequential motion parsing-based approach is applied for automatically determining one or more animations in response to a message in a session between a user and a chatbot, and further generating motions of the physical avatar.

The process 800 is a modification version of the process 500 in FIG. 5, wherein, in the process 800, the facial animations and/or body animations determined through the sequential motion parsing are used for driving the physical avatar to generate motions of the physical avatar, instead of generating video displaying motions of a virtual avatar.

According to the process 800, the facial animations and/or body animations determined through the sequential motion parsing at 520 may be provided to a control unit 840 inside the physical avatar. In an implementation, a MSML file 522 comprising at least the facial animations and/or body animations may be provided to the control unit 840. The control unit 840 may correspond to the control unit 424 in FIG. 4.

At 850, the control unit 840 may drive mechanical units in the physical avatar according to at least the facial animations and/or body animations or the MSML file 522, in a similar way with that the control unit 424 drives mechanical units in the mechanical unit set 422 in FIG. 4. Accordingly, the physical avatar may make facial and/or body motions corresponding to the message 510.

Figure 9:
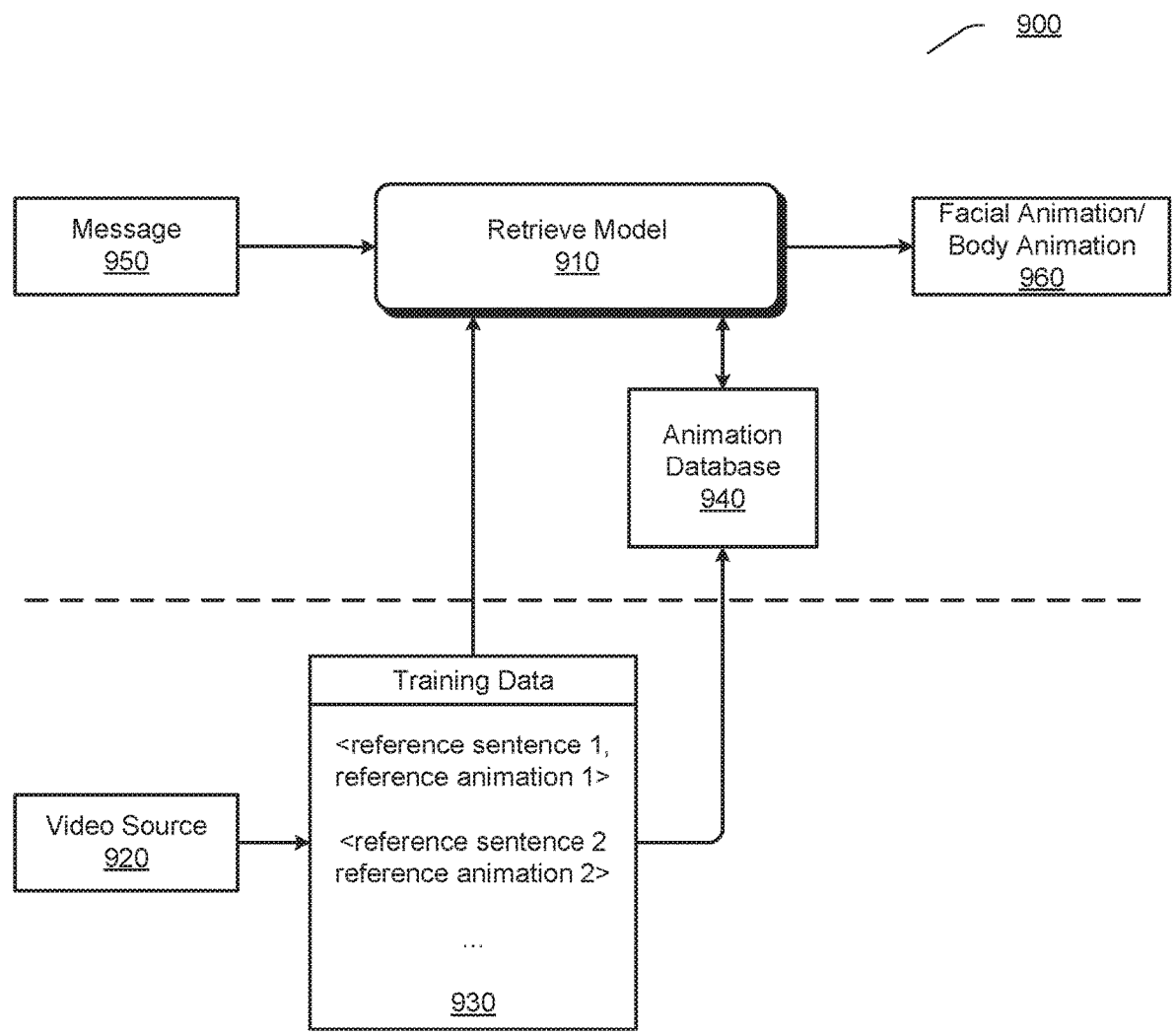
FIG. 9 illustrates an exemplary process for determining animations through a retrieve model according to an embodiment.

FIG. 9 illustrates an exemplary process 900 for determining animations through a retrieve model according to an embodiment. According to the process 900, a retrieve-based approach is applied for automatically determining animations in response to a message in a session between a user and a chatbot. The determined animations may be further used for generating motions of an avatar in a similar way as discussed in connection with FIG. 5 and FIG. 8.

A retrieve model 910 is shown in FIG. 9, which may retrieve facial animation and/or body animation from an animation database based on a message. The lower part of FIG. 9 shows a training process for the retrieve model 910.

Video source 920 may refer to a number of movies. The video source 920 may also refer to a number of video clips obtained from various social media. Taking movie as an example, a movie may comprise a script and a video, wherein the script comprises sentences spoken by actors, and the video comprises visual representations of the actors' facial motions and body motions. Training data 930 may be extracted from the video source 920. For example, for a sentence in the script of the movie, facial motions and/or body motions of an actor speaking the sentence or an actor listening to the sentence may be displayed on a screen. Animation indicating the facial motions and/or the body motions may be created through various existing 3D reconstruction techniques, and the animation may be mapped to the sentence. Thus, a number of training data in a form of <reference sentence, reference animation> may be obtained, wherein the reference animation may refer to one or more facial animation and/or body animation. The training data 930 may be used for training the retrieve model 910, such that the retrieve model 910 may establish mapping relationship among a number of reference sentences and a number of reference animations.

In an implementation, the training data 930 may be further used for establishing an animation database 940. The animation database 940 may comprise a number of reference sentences and a number of reference facial and/or body animations that are mapped to each other.

When applying the trained retrieve model 910, a message 950 may be provided to the retrieve model 910. The retrieve model 910 may identify a reference sentence from the animation database 940, which is relevant with the message 910. The identifying of the reference sentence associated with the message 940 may be performed through a sentence similarity model. The sentence similarity model may adopt at least one feature of emotion vector, word vector, Latent Dirichlet Allocation (LDA) distribution, sentence type vector, etc., for conducting similarity matching between the message 950 and reference sentences in the animation database 940. If a reference sentence associated with the message 950 is identified, reference facial animation and/or reference body animation corresponding to the reference sentence may be retrieved from the animation database 940 and used as facial animation and/or body animation 960 corresponding to the message 950.

The facial animation and/or body animation 960 determined by the retrieve model 910 may be further used for generating motions of the avatar.

Figure 10:
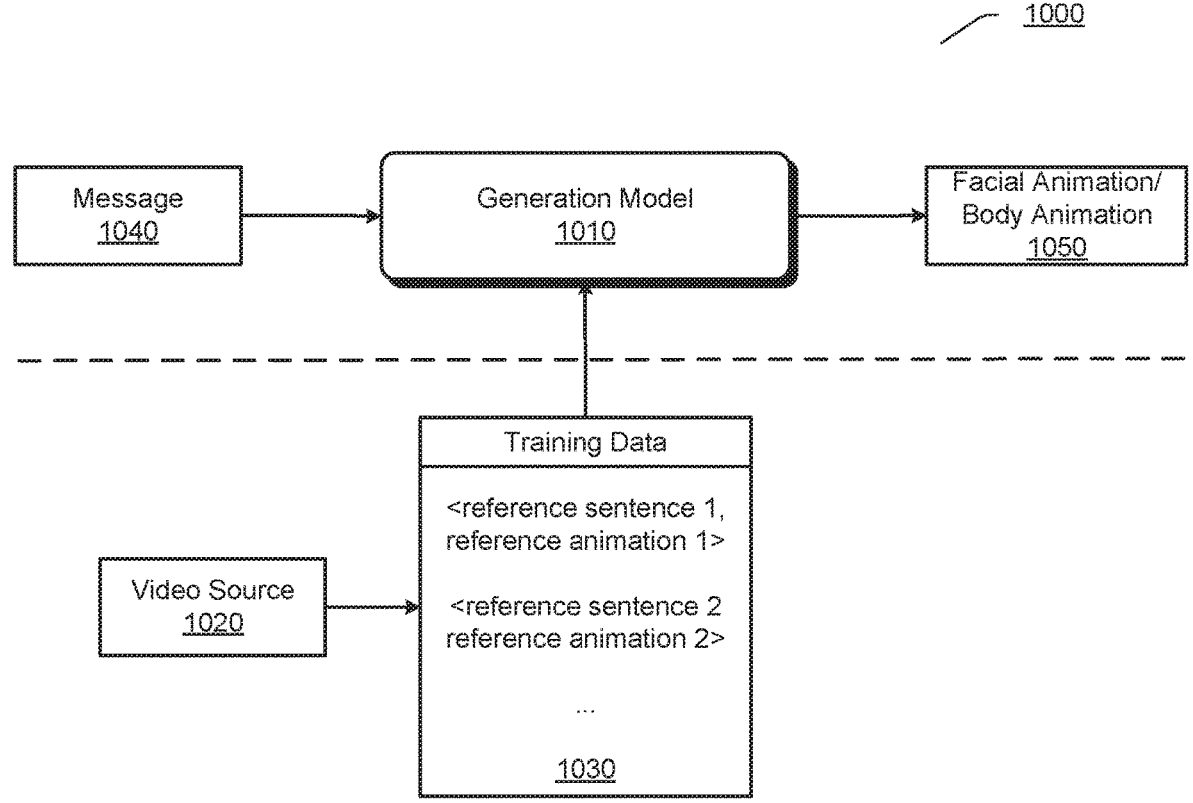
FIG. 10 illustrates an exemplary process for determining animations through a generation model according to an embodiment.

FIG. 10 illustrates an exemplary process 1000 for determining animations through a generation model according to an embodiment. According to the process 1000, a generation-based approach is applied for automatically determining animations in response to a message in a session between a user and a chatbot. The determined animations may be further used for generating motions of an avatar in a similar way as discussed in connection with FIG. 5 and FIG. 8.

A generation model 1010 is shown in FIG. 10, which may generate facial animation and/or body animation based on a message. The lower part of FIG. 10 shows a training process for the generation model 1010. Video source 1020 and training data 1030 may be the same as the video source 920 and the training data 930 respectively.

The generation model 1010 may be trained in a sequence-to-sequence manner by the training data 1030 which comprises a number of <reference sentence, reference animation> pairs.

When applying the trained generation model 1010, a message 1040 may be provided to the generation model 1010. The generation model 1010 may generate facial animation and/or body animation 1050 based on the message 1040. The facial animation and/or body animation 1050 determined by the generation model 1010 may be further used for generating motions of the avatar.

Figure 11:
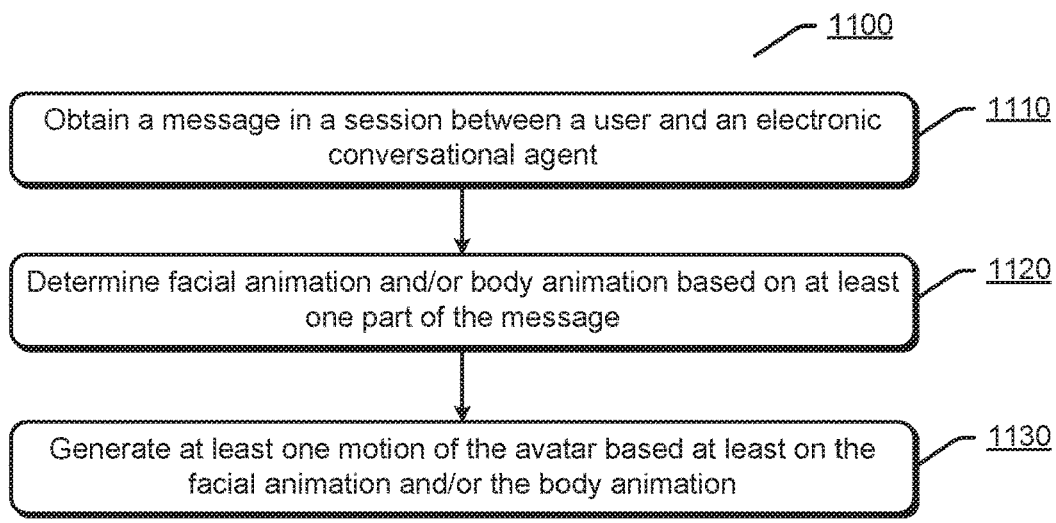
FIG. 11 illustrates a flowchart of an exemplary method for automatically generating motions of an avatar according to an embodiment.

FIG. 11 illustrates a flowchart of an exemplary method 1100 for automatically generating motions of an avatar according to an embodiment.

At 1110, a message in a session between a user and an electronic conversational agent may be obtained, the avatar being a visual representation of the electronic conversational agent.

At 1120, at least one facial animation and/or body animation may be determined based on at least one part of the message.

At 1130, at least one motion of the avatar may be generated based at least on the facial animation and/or the body animation.

In an implementation, the determining may comprise: performing sequential motion parsing on a plain text or a SSML file obtained from the message, to determine the facial animation and/or the body animation.

The sequential motion parsing may be further performed for determining a time period of the facial animation and/or the body animation.

The sequential motion parsing may be based on at least one of: keyword in the message, emotion of the message, sentence type of the message, pronoun in the message, and greeting in the message.

The sequential motion parsing may be implemented by a rule-based model and/or a machine learning model. The rule-based model may be configured for determining the facial animation and/or the body animation from an animation database, through applying a set of predefined rules on the at least one part of the message. The machine learning model may be configured for determining the facial animation and/or the body animation from the animation database, through performing sequence tagging on the message.

The method may further comprise: generating a MSML file through performing the sequential motion parsing, the MSML file at least comprising indications of the facial animation and/or the body animation, and wherein the generating the at least one motion of the avatar comprises: generating the at least one motion of the avatar based on the MSML file.

The facial animation may indicate at least one of: continuous facial expression associated with the message or a context of the message, instant facial expression associated with the at least one part of the message, mouth shape corresponding to each word in the message, and blink.

The body animation may indicate at least one of: normal body motion, emotion-related body motion, sentence type-related body motion, pronoun-related body motion, greeting-related body motion, symbolic body motion, trivial body motion, and body motion habit.

In an implementation, the determining may comprise: retrieving the facial animation and/or the body animation from an animation database based on the message through a retrieve model, the animation database comprising at least one reference sentence and corresponding reference facial animation and/or reference body animation. The retrieve model may be configured for identifying a reference sentence associated with the message from the animation database, and retrieving a reference facial animation and/or reference body animation corresponding to the reference sentence from the animation database as the facial animation and/or the body animation.

The reference sentence associated with the message may be identified through a sentence similarity model, the sentence similarity model adopting at least one of the following features: emotion vector, word vector, LDA distribution, and sentence type vector.

In an implementation, the determining may comprise: generating the facial animation and/or the body animation based on the message through a generation model, the generation model being trained in a sequence-to-sequence manner by at least one reference sentence and corresponding reference facial animation and/or reference body animation.

In an implementation, the avatar may be a virtual avatar, and the generating may comprise: generating the at least one motion of the avatar through synthesizing the virtual avatar and the facial animation and/or the body animation.

In an implementation, the avatar may be a physical avatar, and the generating may comprise: generating the at least one motion of the avatar through driving the physical avatar by the facial animation and/or the body animation.

In an implementation, the method may further comprise: presenting the at least one motion of the avatar together with an audio obtained from the message if the message is obtained from the electronic conversational agent; or presenting the at least one motion of the avatar if the message is obtained from the user.

It should be appreciated that the method 1100 may further comprise any steps/processes for automatically generating motions of an avatar according to the embodiments of the present disclosure as mentioned above.

Figure 12:
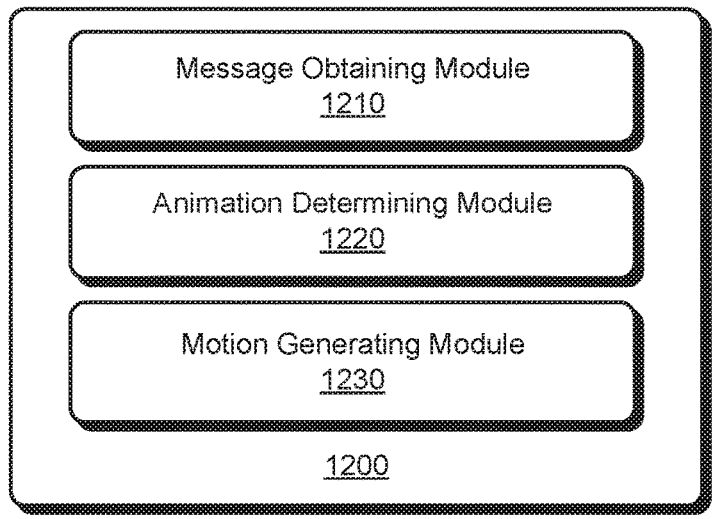
FIG. 12 illustrates an exemplary apparatus for automatically generating motions of an avatar according to an embodiment.

FIG. 12 illustrates an exemplary apparatus 1200 for automatically generating motions of an avatar according to an embodiment.

The apparatus 1200 may comprise: a message obtaining module 1210, for obtaining a message in a session between a user and an electronic conversational agent, the avatar being a visual representation of the electronic conversational agent; an animation determining module 1220, for determining at least one facial animation and/or body animation based on at least one part of the message; and a motion generating module 1230, for generating at least one motion of the avatar based at least on the facial animation and/or the body animation.

In an implementation, the animation determining module 1220 may be further for: performing sequential motion parsing on a plain text or a SSML file obtained from the message, to determine the facial animation and/or the body animation.

In an implementation, the animation determining module 1220 may be further for: retrieving the facial animation and/or the body animation from an animation database based on the message through a retrieve model, the animation database comprising at least one reference sentence and corresponding reference facial animation and/or reference body animation. The retrieve model may be configured for identifying a reference sentence associated with the message from the animation database, and retrieving a reference facial animation and/or reference body animation corresponding to the reference sentence from the animation database as the facial animation and/or the body animation.

In an implementation, the animation determining module 1220 may be further for: generating the facial animation and/or the body animation based on the message through a generation model, the generation model being trained in a sequence-to-sequence manner by at least one reference sentence and corresponding reference facial animation and/or reference body animation.

In an implementation, the avatar may be a virtual avatar, and the motion generating module 1230 may be further for: generating the at least one motion of the avatar through synthesizing the virtual avatar and the facial animation and/or the body animation.

In an implementation, the avatar may be a physical avatar, and the motion generating module 1230 may be further for: generating the at least one motion of the avatar through driving the physical avatar by the facial animation and/or the body animation.

Moreover, the apparatus 1200 may also comprise any other modules configured for automatically generating motions of an avatar according to the embodiments of the present disclosure as mentioned above.

Figure 13:
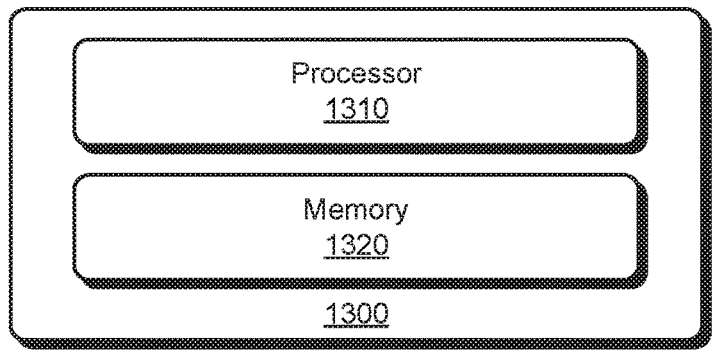
FIG. 13 illustrates an exemplary apparatus for automatically generating motions of an avatar according to an embodiment.

FIG. 13 illustrates an exemplary apparatus 1300 for automatically generating motions of an avatar according to an embodiment.

The apparatus 1300 may comprise one or more processors 1310 and a memory 1320 storing computer-executable instructions. When executing the computer-executable instructions, the one or more processors 1310 may: obtain a message in a session between a user and an electronic conversational agent, the avatar being a visual representation of the electronic conversational agent; determine at least one facial animation and/or body animation based on at least one part of the message; and generate at least one motion of the avatar based at least on the facial animation and/or the body animation. The one or more processors 1310 may be further configured for performing any operations of the methods for automatically generating motions of an avatar according to the embodiments of the present disclosure as mentioned above.

The embodiments of the present disclosure may be embodied in a non-transitory computer-readable medium. The non-transitory computer-readable medium may comprise instructions that, when executed, cause one or more processors to perform any operations of the methods for automatically generating motions of an avatar according to the embodiments of the present disclosure as mentioned above.

It should be appreciated that all the operations in the methods described above are merely exemplary, and the present disclosure is not limited to any operations in the methods or sequence orders of these operations, and should cover all other equivalents under the same or similar concepts.

It should also be appreciated that all the modules in the apparatuses described above may be implemented in various approaches. These modules may be implemented as hardware, software, or a combination thereof. Moreover, any of these modules may be further functionally divided into sub-modules or combined together.

Processors have been described in connection with various apparatuses and methods. These processors may be implemented using electronic hardware, computer software, or any combination thereof. Whether such processors are implemented as hardware or software will depend upon the particular application and overall design constraints imposed on the system. By way of example, a processor, any portion of a processor, or any combination of processors presented in the present disclosure may be implemented with a microprocessor, microcontroller, digital signal processor (DSP), a field-programmable gate array (FPGA), a programmable logic device (PLD), a state machine, gated logic, discrete hardware circuits, and other suitable processing components configured to perform the various functions described throughout the present disclosure. The functionality of a processor, any portion of a processor, or any combination of processors presented in the present disclosure may be implemented with software being executed by a microprocessor, microcontroller, DSP, or other suitable platform.

Software shall be construed broadly to mean instructions, instruction sets, code, code segments, program code, programs, subprograms, software modules, applications, software applications, software packages, routines, subroutines, objects, threads of execution, procedures, functions, etc. The software may reside on a computer-readable medium. A computer-readable medium may include, by way of example, memory such as a magnetic storage device (e.g., hard disk, floppy disk, magnetic strip), an optical disk, a smart card, a flash memory device, random access memory (RAM), read only memory (ROM), programmable ROM (PROM), erasable PROM (EPROM), electrically erasable PROM (EEPROM), a register, or a removable disk. Although memory is shown separate from the processors in the various aspects presented throughout the present disclosure, the memory may be internal to the processors, e.g., cache or register.

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein. All structural and functional equivalents to the elements of the various aspects described throughout the present disclosure that are known or later come to be known to those of ordinary skilled in the art are expressly incorporated herein by reference and are intended to be encompassed by the claims.

What is claimed is:

1. A method for automatically generating motions of an avatar, comprising:
    obtaining a message in a session between a user and an electronic conversational agent, the avatar being a visual representation of the electronic conversational agent;
    performing sequential motion parsing to determine a facial animation based on at least one part of the message, wherein the sequential motion parsing determines a time period of the facial animation and the sequential motion parsing is based on at least one of: a keyword in the message, an emotion of the message, a sentence type of the message, a pronoun in the message, and a greeting in the message;
    presenting the facial animation, the facial animation having a first facial expression associated with first content of the message and an instant variable second facial expression interspersed within the first facial expression during the presentation of the facial animation, the instant variable second facial expression being variable and different from the first facial expression based on second content of the message that is different from the first content, the instant variable second facial expression being created in real time and interspersed within the first facial expression in real time during the presentation of the facial animation, the message including a waiting period that allows for complete presentation of the instant variable second facial expression, wherein the first facial expression is presented after the complete presentation of the instant variable second facial expression; and
    generating at least one motion of the avatar based at least on the facial animation.

2. The method of claim 1, wherein the sequential motion parsing is performed on a plain text or a Speech Synthesis Markup Language (SSML) file obtained from the message, to determine the facial animation.

3. The method of claim 2, wherein the sequential motion parsing is implemented by a rule-based model and/or a machine learning model,
    the rule-based model being configured for determining the facial animation from an animation database, through applying a set of predefined rules on the at least one part of the message,
    the machine learning model being configured for determining the facial animation from the animation database, through performing sequence tagging on the message.

4. The method of claim 2, further comprising:
    generating a Motion Synthesis Markup Language (MSML) file through performing the sequential motion parsing, the MSML file at least comprising an indication of the facial animation; and
    wherein the generating the at least one motion of the avatar comprises: generating the at least one motion of the avatar based on the MSML file.

5. The method of claim 1, wherein the determining comprises:
    retrieving the facial animation from an animation database based on the message through a retrieve model, the animation database comprising at least one reference sentence and corresponding reference facial animation,
    wherein the retrieve model is configured for identifying a reference sentence associated with the message from the animation database and retrieving a reference facial animation corresponding to the reference sentence from the animation database as the facial animation.

6. The method of claim 5, wherein the reference sentence associated with the message is identified through a sentence similarity model, the sentence similarity model adopting at least one of a following feature: emotion vector, word vector, Latent Dirichlet Allocation (LDA) distribution, and sentence type vector.

7. The method of claim 1, wherein the determining comprises generating the facial animation based on the message through a generation model, the generation model being trained in a sequence-to-sequence manner by at least one reference sentence and corresponding reference facial animation.

8. The method of claim 1, wherein the avatar is a virtual avatar, and the generating comprises generating the at least one motion of the avatar through synthesizing the virtual avatar and the facial animation.

9. The method of claim 1, wherein the avatar is a physical avatar, and the generating comprises generating the at least one motion of the avatar through driving the physical avatar by the facial animation.

10. The method of claim 1, further comprising:
presenting the at least one motion of the avatar together with an audio obtained from the message if the message is obtained from the electronic conversational agent; or
presenting the at least one motion of the avatar if the message is obtained from the user.

11. An apparatus for automatically generating motions of an avatar, comprising:
a message obtaining module, for obtaining a message in a session between a user and an electronic conversational agent, the avatar being a visual representation of the electronic conversational agent;
an animation determining module, for performing sequential motion parsing to determine a facial animation based on at least one part of the message, wherein the sequential motion parsing determines a time period of the facial animation and the sequential motion parsing is based on at least one of: a keyword in the message, an emotion of the message, a sentence type of the message, a pronoun in the message, and a greeting in the message;
a module for presenting the facial animation, the facial animation having a first facial expression associated with first content of the message and an instant variable second facial expression interspersed within the first facial expression during the presentation of the facial animation, the instant variable second facial expression being variable and different from the first facial expression based on second content of the message that is different from the first content the instant variable second facial expression being created in real time and interspersed within the first facial expression in real time during the presentation of the facial animation, the message including a waiting period that allows for complete presentation of the instant variable second facial expression, wherein the first facial expression is presented after the complete presentation of the instant variable second facial expression; and
a motion generating module, for generating at least one motion of the avatar based at least on the facial animation.

12. The apparatus of claim 11, wherein the animation determining module performs sequential motion parsing on a plain text or a Speech Synthesis Markup Language (SSML) file obtained from the message, to determine the facial animation.

13. The apparatus of claim 11, wherein the animation determining module is further for:
retrieving the facial animation from an animation database based on the message through a retrieve model, the animation database comprising at least one reference sentence and corresponding reference facial animation,
wherein the retrieve model is configured for identifying a reference sentence associated with the message from the animation database and retrieving a reference facial animation corresponding to the reference sentence from the animation database as the facial animation and/or body animation.

14. The apparatus of claim 11, wherein the animation determining module is further for generating the facial animation based on the message through a generation model, the generation model being trained in a sequence-to-sequence manner by at least one reference sentence and corresponding reference facial animation.

15. The apparatus of claim 11, wherein the avatar is a virtual avatar, and the motion generating module is further for generating the at least one motion of the avatar through synthesizing the virtual avatar and the facial animation.

16. The apparatus of claim 11, wherein the avatar is a physical avatar, and the motion generating module is further for generating the at least one motion of the avatar through driving the physical avatar by the facial animation.

17. An apparatus for automatically generating motions of an avatar, comprising:
one or more processors; and
a memory storing computer-executable instructions that, when executed, cause the one or more processors to:
obtain a message in a session between a user and an electronic conversational agent, the avatar being a visual representation of the electronic conversational agent;
performing sequential motion parsing to determine a facial animation based on at least one part of the message, wherein the sequential motion parsing determines a time period of the facial animation and the sequential motion parsing is based on at least one of: a keyword in the message, an emotion of the message, a sentence type of the message, a pronoun in the message, and a greeting in the message;
present the facial animation, the facial animation having a first facial expression associated with first content of the message and an instant variable second facial expression interspersed within the first facial expression during the presentation of the facial animation, the instant variable second facial expression being variable and different from the first facial expression based on second content of the message that is different from the first content the instant variable second facial expression being created in real time and interspersed within the first facial expression in real time during the presentation of the facial animation, the message including a waiting period that allows for complete presentation of the instant variable second facial expression, wherein the first facial expression is presented after the complete presentation of the instant variable second facial expression; and
generate at least one motion of the avatar based at least on the facial animation.

* * * * *